United States Patent [19]

Gordon et al.

[11] Patent Number: 4,788,758
[45] Date of Patent: Dec. 6, 1988

[54] METHOD OF MAKING AXIALLY HARDENED BEARINGS

[75] Inventors: Keith M. Gordon, Munsonville; Michael L. Blair, Keene, both of N.H.

[73] Assignee: MPB Corporation, Keene, N.H.

[21] Appl. No.: 100,596

[22] Filed: Sep. 24, 1987

[51] Int. Cl.$^4$ ............................................. B21H 1/14
[52] U.S. Cl. .................. 29/148.4 R; 29/434; 29/445; 51/291; 384/537
[58] Field of Search ............ 29/148.4 R, 434, 445, 29/446; 51/290, 291, 324; 384/490, 510, 515, 537

[56] References Cited

U.S. PATENT DOCUMENTS

| | | | |
|---|---|---|---|
| 2,481,146 | 9/1949 | Palumbo | 384/515 |
| 2,553,536 | 5/1951 | Frenkel | 384/515 |
| 3,330,634 | 7/1967 | Rae | 51/291 |
| 3,428,379 | 2/1969 | Readman | 384/537 |

*Primary Examiner*—Timothy V. Eley
*Assistant Examiner*—Frances Chin

[57] ABSTRACT

A method of forming a ball bearing assembly capable of withstanding, in a non-operating mode, an axial load exceeding a predetermined axial load at which bearing damage would otherwise occur includes the following steps: assembling a bearing assembly with at least one set of annular bearing races and, disposed therebetween, a multiplicity of balls, each race having a face surface aligned transversely to the axis of rotation of the bearing assembly, (b) mounting the bearing with the first race fixed axially, (c) applying an axially directed load against the second race of a predetermined magnitude selected to be greater than the intended operating preload and less than a bearing damaging load, (d) grinding the face surfaces of the bearing races flush, (e) releasing the force, and (f) in operating condition, providing a stop ring having a flat stop face surface opposed to the face surfaces of the bearing races, the face surface of the first bearing race disposed in engagement with the stop face surface and the face surface of the second bearing race, under normal axial load, spaced therefrom. Application of an axial load upon the bearing assembly causes the face surface of the first race to move toward the stop face surface and, at axial loading above the predetermined force, to bear thereupon, whereby axial load in excess of the predetermined magnitude is carried by the stop ring. A ball bearing assembly, e.g., formed according to the method, is also described.

3 Claims, 2 Drawing Sheets

METHOD OF MAKING AXIALLY HARDENED BEARINGS

The invention relates to ball bearing assemblies constructed to withstand, in a non-operating mode, a load exceeding that which would normally cause damage to the bearing.

In the past, it has been proposed to provide protection against damage under excessive radial loading by providing the bearing 10 (FIG. 1) with a very small clearance, C, between lands 12, 14 of bearing races 13, 15 such that under high radial loading, indicated by arrow, $F_R$, the lands will touch and take additional load rather than letting it pass through the balls 16 and races 18. Protection against excessive loading of bearings 20, 21 mounted about screw 22 (FIG. 2) in the axial direction, indicated by arrow, $F_A$, has in the past been provided, for example, by selection and/or machining of the mounting screw 22 to provide a gap, G. Under excessive axial loading, the side face 26 of bearing race 24 engages the screw surface 28 to transmit the additional load.

SUMMARY OF THE INVENTION

According to one aspect of the invention, a method of forming a ball bearing assembly capable of withstanding, in a non-operating mode, an axial load exceeding a predetermined axial load at which bearing damage would otherwise occur, the method comprising: (a) assembling a bearing assembly comprising at least one set of first and second annular bearing races and, disposed therebetween, a multiplicity of balls, each race having a face surface aligned transversely to the axis of rotation of the bearing assembly, (b) mounting the bearing with the first race fixed axially, (c) applying an axially directed load against the second race of a predetermined magnitude selected to be greater than the intended operating preload and less than a bearing damaging load, (d) grinding the face surfaces of first and second bearing races flush, (e) releasing the force, and (f) in operating condition, providing a stop ring having a flat stop face surface opposed to the face surfaces of the bearing races, the face surface of the first bearing race disposed in engagement with the stop face surface and the face surface of the second bearing race, under normal axial load, spaced therefrom, application of an axial load upon the bearing assembly causing the face surface of the second race to move toward the stop face surface and, at axial loading above the predetermined force, to bear thereupon, whereby axial load in excess of the predetermined magnitude is carried by said stop ring.

Preferred embodiments of this aspect of the invention may include the following features. In a multiple race bearing assembly, steps b, c, d and e are repeated for other sets of first and second annular bearing races, and, as in step f, a stop ring having a flat stop face surface for additional sets is provided, whereby the bearing assembly is protected against loading applied in either axial direction in excess of a predetermined magnitude. The method includes the further step of providing in the ball bearing assembly, means for interengaging, in a non operating mode, upon application of a radial load exceeding a predetermined radial load at which bearing damage would otherwise occur.

According to another aspect of the invention, a ball bearing assembly capable of withstanding, in a non-operating mode, an axial load exceeding a predetermined axial load at which bearing damage would otherwise occur, comprises a bearing assembly comprising at least one set of first and second annular bearing races and, disposed therebetween, a multiplicity of balls, each bearing race having a face surface disposed transversely to the axis of rotation of the bearing assembly, and a stop ring having a flat stop surface opposed to the face surfaces of the bearing races, the face surface of the first bearing race disposed in engagement with the stop face surface, the face surface of the second bearing race, in a first condition of normal axial loading, spaced from the stop face surface and the face surface of the second bearing race adapted to engage upon the stop face surface of the stop ring in response to application of axial loading of a predetermined magnitude upon the bearing assembly, whereby axial force in excess of the predetermined magnitude is carried by the stop ring.

Preferred embodiments of this aspect of the invention may include the following features. The bearing assembly comprises more than one set of first and second annular bearing races, and a stop ring for additional sets whereby the bearing assembly is protected against force applied in either axial direction in excess of a predetermined magnitude. The bearing assembly further comprises means for interengaging upon application of radial force in excess of a predetermined radial load at which bearing damage would otherwise occur.

These and other features and advantages of the invention will be obvious from the following description of a presently preferred embodiment and from the claims.

PREFERRED EMBODIMENT

We first briefly describe the drawings.

FIG. 3 is a somewhat diagrammatic representation of a bearing assembly constructed according to the invention for protection against excessive axial loading, while

Figure 3:
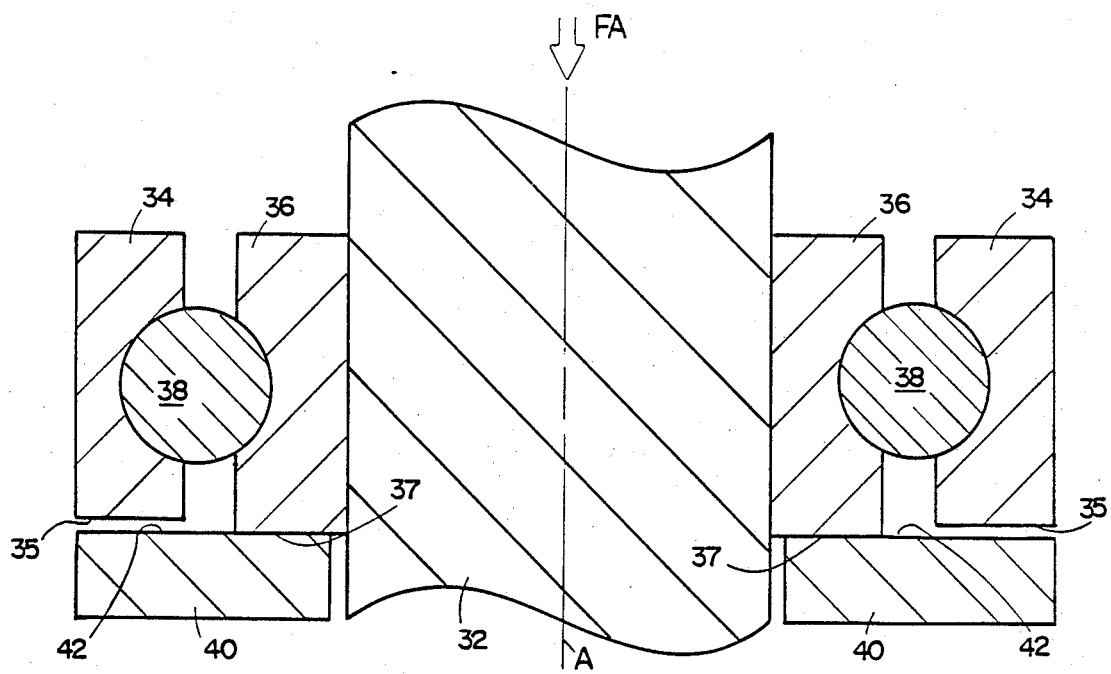

Referring to FIG. 3, bearing assembly 30 is constructed according to the invention to be capable of withstanding, in a non-operating mode, an axial load, indicated by arrow $F_A$, exceeding a predetermined axial load at which bearing damage would otherwise occur. Bearing assembly 30 disposed about shaft 32, e.g., a component of a guidance system for a cannon-launched missile, consists of a set of first 36 and second 34 annular bearing races and, disposed therebetween, a multiplicity of balls 38. Each bearing race has a face surface 35, 37 disposed transversely, and preferably perpendicular, to the axis, A, of rotation of the bearing assembly. A stop ring 40 is also provided, having a flat stop surface 42 opposed to the face surfaces 35, 37 of the bearing races. The face surface of one race, i.e., the non-rotating race, e.g., surface 37 of race 36, is disposed in engagement with the stop face surface 42. The face surface 35 of the other bearing race 34 is spaced from engagement with surface 42 under conditions of normal axial loading (FIG. 3).

Figure 4:
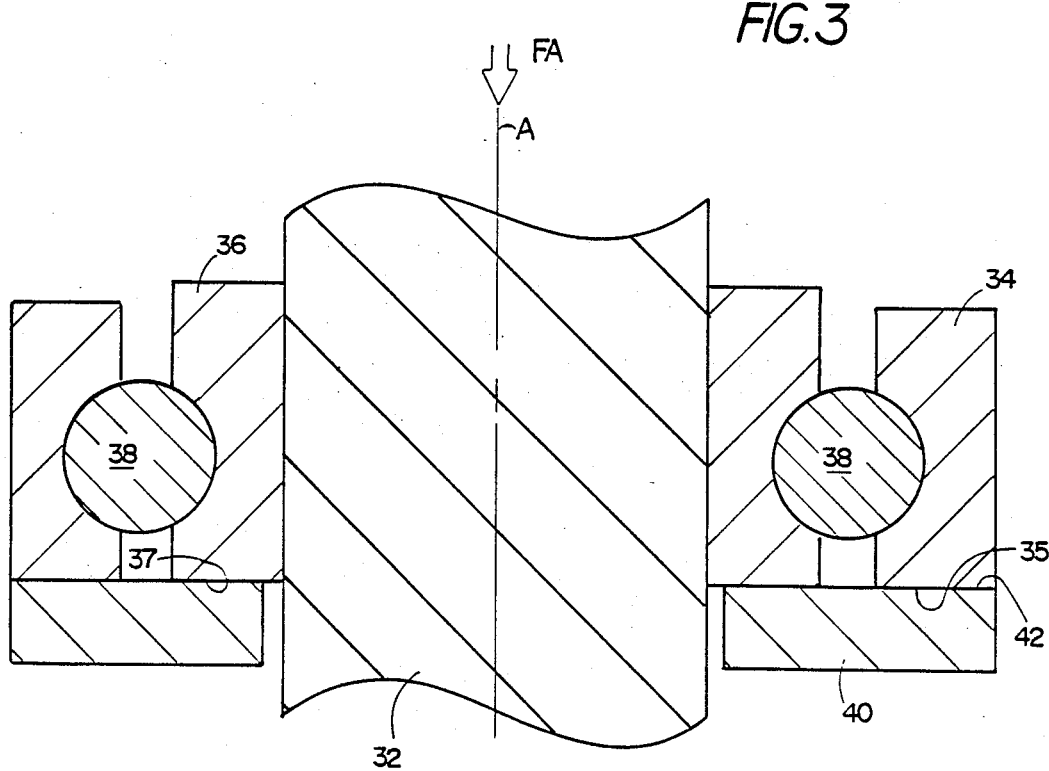
FIG. 4 is a similar view of the bearing assembly of FIG. 3 under excessive axial loading.

Referring now to FIG. 4, when an axial load, indicated by arrow $F_A$, is applied, e.g., when the missile containing shaft 32 is launched, bearing assembly 30 is in a non-operating mode, as shown. The excessive axial load, far above the axial load rating of bearing assembly 30, displaces bearing race 34 toward stop ring 40, until surface 35 of the race engages upon surface 42 of the stop ring. This engagement occurs at axial loading of predetermined magnitude, selected so that axial loading above that magnitude, that would otherwise damage the bearing, is carried by stop ring 40.

The bearing assembly 30 of the invention is constructed by assembling a standard bearing consisting of first 36 and second 34 annular bearing races, with a multiplicity of balls 38 disposed therebetween. The bearing assembly is mounted with the nonrotating race 36 fixed axially. An axially directed force is applied against the other race 34, the force being of a magnitude selected to be greater than the intended operating preload, and less than a bearing damaging load, and the face surfaces 35, 37 are ground flush. The force is then removed.

In operating condition, the stop ring 40 is provided with flat stop face surface 42 opposed to the face surfaces 35, 37 of the races. The face surface 37 is disposed in engagement with surface 42, under normal axial load, with the surface 35 of race 34 spaced therefrom.

Upon application of excessive axial load, e.g., when the cannon is fired, race 34 is urged by axially directed force $F_A$ toward the stop ring until surfaces 35, 42 are interengaged. This interengagement occurs at the predetermined magnitude of axial load selected to be below the axial load at which bearing damage could otherwise occur, and additional load is carried by the stop ring.

Figure 5:
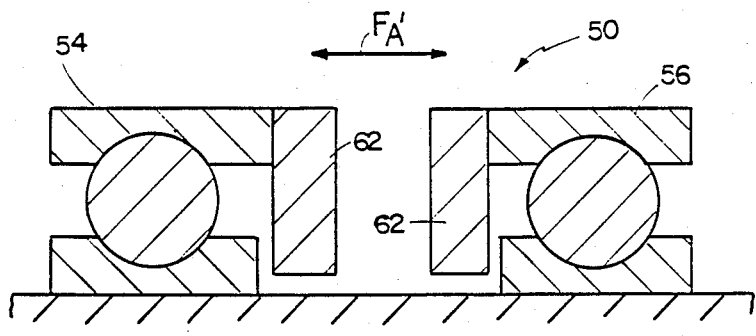
FIGS. 5 and 6 are similar views of bearing assembly pairs protected according to the invention against excessive loading in both axial directions.
Figure 7:
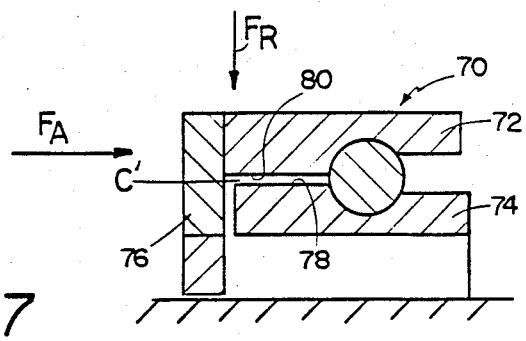
FIG. 7 is a similar view of a bearing assembly constructed according to the invention for protection against excessive loading in both axial and radial directions.
Figure 6:
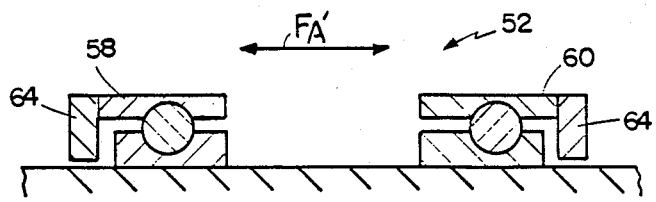
Figure 1:
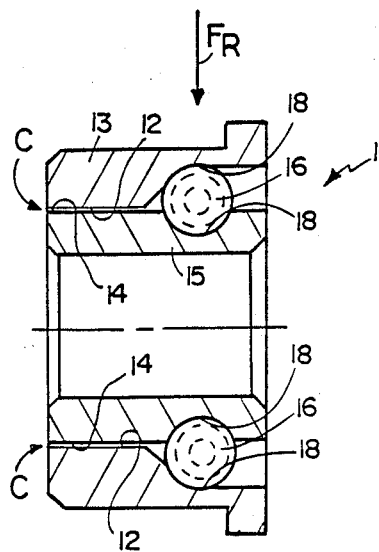
FIGS. 1 and 2 are side section views of prior art bearing assemblies, as described above.
Figure 2:
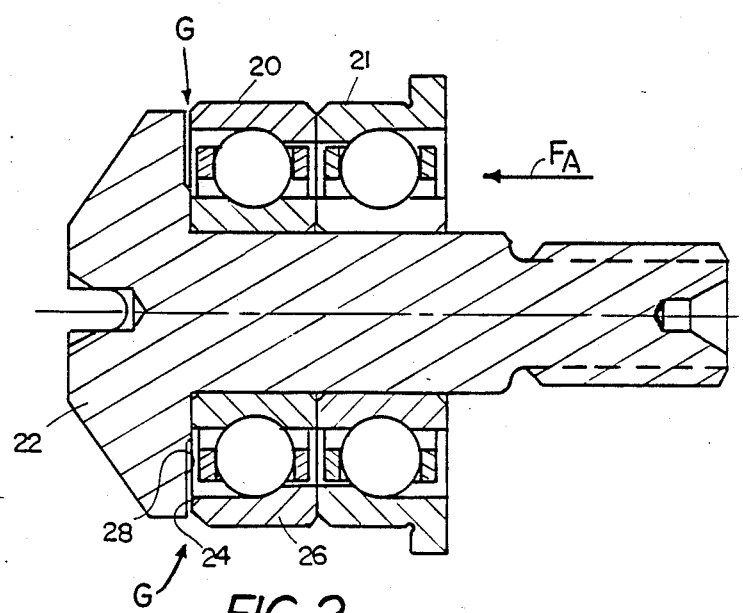

Other embodiments are within the following claims. For example, in FIGS. 5 and 6, bearing assemblies 50, 52 consist of preloaded pairs of bearings, each set 54, 56 and 58, 60 of races having associated stop rings 62, 64, respectively, whereby each pair of assemblies is protected against excessive axial loading in both axial directions, indicated by double arrow $F_A'$. In FIG. 7, a bearing assembly 70 having a pair of races 72, 74 is provided with stop ring 76 for protection against excessive axial load ($F_A$), as described above, and further has lands 78, 80 with a very small clearance, C', to provide protection against excessive radial loading ($F_R$) as described with references to FIG. 1.

What is claimed is:

1. A method of forming a ball bearing assembly capable of withstanding, in a non-operating mode, an axial load exceeding a predetermined axial load at which bearing damage would otherwise occur, said method comprising:
    a. assembling a bearing assembly comprising at least one set of first and second annular bearing races and, disposed therebetween, a multiplicity of balls, each said race having a face surface aligned transversely to the axis of rotation of said bearing assembly,
    b. mounting the bearing with the first said race fixed axially,
    c. applying an axially directed load against the second said race, said axially directed load being of a predetermined magnitude selected to the greater than the intended operating preload and less than a bearing damaging load,
    d. grinding the face surfaces of said first and second bearing races flush,
    e. releasing said force, and
    f. providing a stop ring having a stop face surface opposed to the face surfaces of said bearing races, the face surface of said first bearing race disposed in engagement with said stop face surface and the face surface of said second bearing race, under normal axial load, spaced therefrom, application of an axial load upon said bearing assembly causing the face surface of the second said race to move toward said stop face surface and, at axial loading above said predetermined magnitude, to bear thereupon, whereby axial load in excess of said predetermined magnitude is carried by said stop ring.

2. The method of claim 1 comprising, in a multiple race bearing assembly,
    repeating steps b, c, d and e for other sets of first and second annular bearing races, and,
    as in step f, providing a stop ring having a
    flat stop face surface for additional of said sets, whereby said bearing assembly is protected against loading applied in either axial direction in excess of a predetermined magnitude.

3. The method of claim 1 comprising the further step of providing, in said ball bearing assembly, first means associated with the first said race and second means associated with the second said race, said first means and said second means adapted to interengage, in a non-operating mode of said bearing assembly, upon application of a radial load exceeding a predetermined radial load at which bearing damage would otherwise occur.

* * * * *

UNITED STATES PATENT AND TRADEMARK OFFICE
CERTIFICATE OF CORRECTION

PATENT NO. : 4,788,758

DATED : December 6, 1988

INVENTOR(S) : Keith M. Gordon and Michael L. Blair

It is certified that error appears in the above-identified patent and that said Letters Patent is hereby corrected as shown below:

On the title page:
In the References, please add:

| | | | | |
|---|---|---|---|---|
| 2,631,904 | 3/17/53 | Frenkel | 384 | 450 |
| 2,917,351 | 12/15/59 | Franke et al. | 29 | 1484AX |
| 3,268,278 | 8/23/66 | Purdy | 384 | 450 |
| 3,306,687 | 2/28/67 | Smith | 384 | 450 |
| 3,447,849 | 6/3/69 | Harris et al | 384 | 450 |
| 3,963,285 | 6/15/76 | Kellstrom | 384 | 450 |
| 3,990,753 | 11/9/76 | Kellstrom | 384 | 450 |
| 4,085,984 | 4/25/78 | Cameron | 384 | 563 |
| 4,203,635 | 5/20/80 | Reiter | 384 | 560 |
| 4,319,789 | 3/16/82 | Irwin | 384 | 450 |
| 4,403,813 | 9/13/83 | Schaefer | 384 | 450 |

Col. 1, lines 63-64; "non operating" should be --non-operating--;

Col. 4, line 13; "to the greater" should be --to be greater--.

Signed and Sealed this

Eighteenth Day of July, 1989

Attest:

DONALD J. QUIGG

Attesting Officer

Commissioner of Patents and Trademarks